United States Patent [19]

Blacker

[11] Patent Number: 5,322,396

[45] Date of Patent: Jun. 21, 1994

[54] HAND-HELD CLAMPING POCKET HOLE DRILL GUIDE

[75] Inventor: Paul N. Blacker, Tewksbury, Mass.

[73] Assignee: Trend-Lines, Inc., Chelsea, Mass.

[21] Appl. No.: 123,908

[22] Filed: Sep. 20, 1993

[51] Int. Cl.⁵ ............................................. B23B 49/02
[52] U.S. Cl. ..................................... 408/72 R; 408/97
[58] Field of Search ................... 408/72 R, 72 B, 97, 408/115 R, 115 B

[56] References Cited

U.S. PATENT DOCUMENTS

| | | | |
|---|---|---|---|
| 2,181,746 | 11/1939 | Siebrandt | 128/83 |
| 2,602,238 | 7/1952 | Wellman | 33/189 |
| 2,674,907 | 4/1954 | Zoll | 77/62 |
| 3,386,318 | 6/1968 | Pekarcik et al. | 77/62 |
| 3,626,513 | 12/1971 | Pytlak | 408/115 |
| 4,601,618 | 7/1986 | McEldowney | 408/1 R |
| 4,730,959 | 3/1988 | Aernie et al. | 408/115 R |
| 4,747,588 | 5/1988 | Dillhoff | 269/6 |
| 4,955,766 | 9/1990 | Sommerfeld | 408/87 |
| 5,163,792 | 11/1992 | Slavik | 408/97 |

OTHER PUBLICATIONS

Woodworker's Supply, Inc. Catalog, p. 118.

Primary Examiner—Steven C. Bishop
Attorney, Agent, or Firm—Bromberg & Sunstein

[57] ABSTRACT

A hand-held clamping drill guide including a pocket hole drill guide and a hand-held clamp. The pocket hole drill guide is rotatably attached to the end of one of two opposed C-shaped arms. The C-shaped arms are movable between an open position and a clamped position by the clamp handles. The clamp face on the other arm is pivotally attached to the end of the arm. The drill guide may be provided with more than one hole for drilling adjacent pocket holes. The clamp may be held and operated by a single hand to secure the pocket hole drill guide against a workpiece for drilling pocket holes.

12 Claims, 2 Drawing Sheets

HAND-HELD CLAMPING POCKET HOLE DRILL GUIDE

BACKGROUND OF THE INVENTION

The present invention is directed to a woodworking tool, in particular, a clamping pocket hole drill guide.

Pocket holes are generally drilled by stepped drill bits. The stepped drill bit is drilled at an angle through a piece of wood. The hole that is drilled permits a screw to be screwed through the wood at an angle while providing a hole in which the head of the screw can be sunk below the surface of the wood. A simple hole at an angle in a piece of wood would leave the screw head protruding from the wood up at an angle. The pocket hole provides a pocket in which the screw head sits after being screwed through the drilled hole.

Conventionally a pocket hole is drilled using a pocket hole drill guide. The drill guide is a metal block with a hole at an angle therethrough. A clamp is used to hold the drill guide securely against a piece of wood.

SUMMARY OF THE INVENTION

The present invention is directed to a single tool that can be used in conjunction with a drill to form pocket holes. The invention is directed to a hand-held clamping drill guide that performs the functions of guiding a drill bit and clamping the guide to the workpiece. The pocket hole drill guide is rotatably attached to the end of one arm of a hand-held clamp. A clamp face is pivotally attached to the end of a second arm of the hand-held clamp. The hand-held clamp can move the arms between an open position and a clamped position. In the clamped position the ends of the arms are prevented from being pulled apart from one another. A lever on one of the handles of the clamp releases the arms from the clamped position. The pocket hole drill guide may be provided with a second hole parallel to the first hole for use in guiding the drilling of two holes into a workpiece. The rotatable attachment of the pocket hole guide to the arm of the clamp may be arranged to provide rotation about two axes. The drill guide of the present invention advantageously can be used without an additional clamp since it provides its own clamping mechanism. Other objects and advantages of the present invention will become apparent during the following description of the presently preferred embodiments of the invention taken in conjunction with the drawings.

DETAILED DESCRIPTION OF THE PREFERRED EMBODIMENTS

Figure 1:
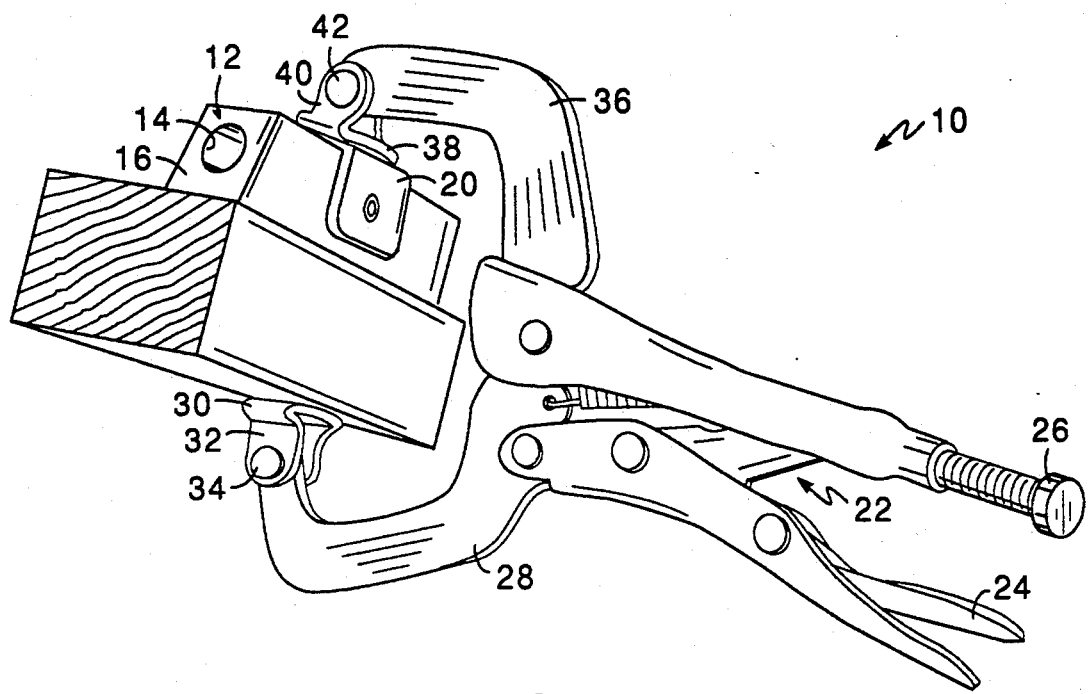
FIG. 1 is a perspective view of the hand-held clamping drill guide of the present invention in the clamped position against a workpiece.
Figure 2:
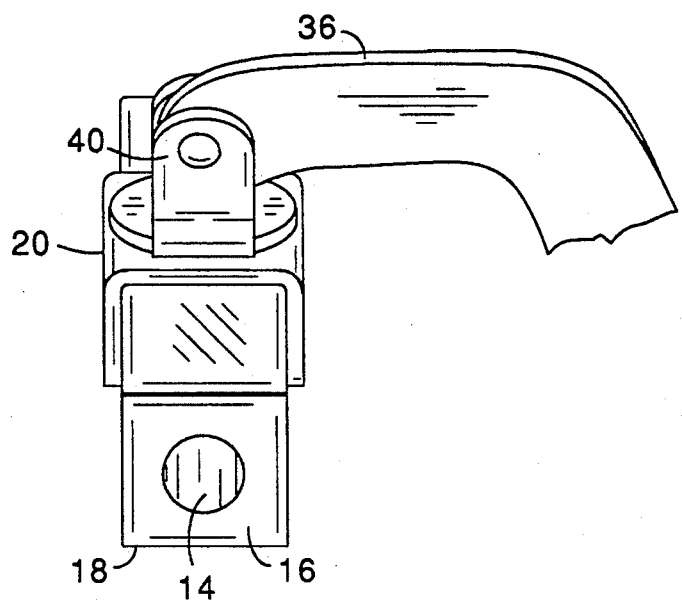
FIG. 2 is a partial side view of the clamping drill guide of FIG. 1.
Figure 3:
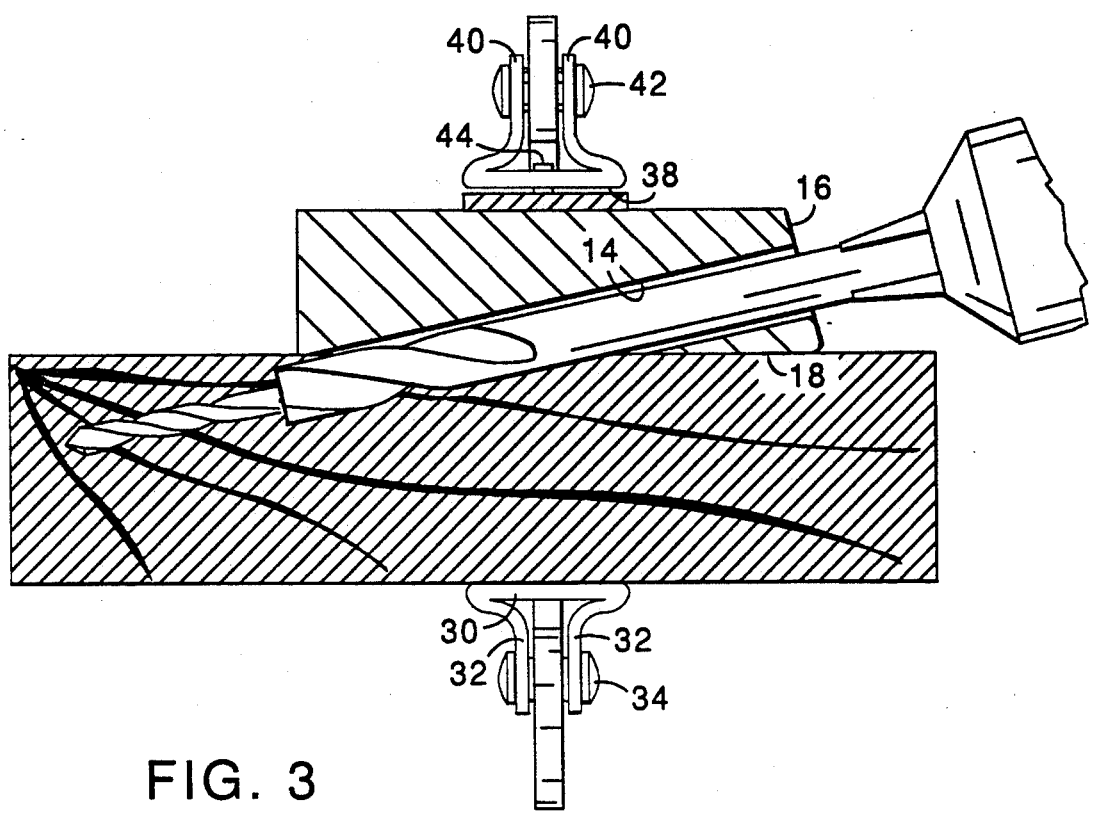
FIG. 3 is an end view of the clamping drill guide of FIG. 1 in partial cross section and being used with a drill.

The hand-held clamping drill guide 10 of the present invention is a combination hand-held clamp and pocket hole drill guide. A pocket hole drill guide 12 is a metal block having a hole 14 therethrough at an angle. The hole 14 extends from an end face of the metal block 12 and out through a side face of the block. The end face 16 of the metal block may be at an angle with respect to the rectangular metal block 12. The angle may be such that the end face is perpendicular to the hole 14. A U-shaped bracket 20 is riveted to the metal block 12. The U-shaped bracket 20 fits snugly over three side faces of the metal block 12.

A conventional hand-held clamp 22 is used to provide a hand-held clamping mechanism. The hand-held clamp 22 includes a pair of handles pivotally attached each to a C-shaped arm. The handles are adapted to be operated using one hand. The handles are moveable between an open position and a clamped position. In the clamped position, the outer ends of the C-shaped arms are locked such that they are prevented from being pulled apart. A lever 24 connected to one of the handles is provided for releasing the handles from the clamped position. By pushing the lever against the handle to which it is attached, the arms are released from the clamped position. The clamping and release mechanism of the clamp 22 are well known in the art. A bolt 26 at the end of one of the handles is used to adjust the distance between the two outer arms when in the clamped position. A first C-shaped arm 28 has one end connected to the clamp and a second end pivotally attached to a clamp face 30. The clamp face 30 is provided on a yoke having two legs 32 depending therefrom. A pin 34 is inserted through the legs and the outer end of the first arm sandwiched between the legs. Thus the pin 34 attaches the clamp face to the end of the first arm 28 in a manner that permits the clamp face 30 to pivot about the end of the arm 28.

The second arm 36 of the clamping drill guide is also attached to a yoke with a flat face 38. The yoke has two legs 40 depending from the flat face 38. A pin 42 is inserted through the pair of legs and the outer end of the second C-shaped arm sandwiched between the legs. The pin is secured at either end about the yoke while the yoke is allowed to freely pivot about the pin on the end of the arm 36.

The flat face 38 of the yoke is attached to the middle face of the U-shaped bracket 20 by a rivet 44 that acts as a pivot pin. The pocket hole drill guide 12 can freely rotate about the rivet 44. The pocket hole drill guide is thus attached to the second arm 36 rotatably so as to permit rotation about two axes. One axis is formed by the connecting pin 42 attaching the yoke to the end 36 of the arm and the other axis is provided by the rivet or pivot pin 44 connecting the face of the yoke to the U-shaped bracket.

In using the clamping drill guide 10 of the present invention a workpiece of wood is inserted between the clamp face 30 and the pocket hole drill guide 12. The clamp face 30 and the pocket hole guide 12 can be rotated to fit against opposite sides of the workpiece. The rotatability of the clamp face and the pocket hole drill guide make the hand-held clamping drill guide 10 able to accommodate different sizes and shapes of workpieces. An operator uses one hand to close the handles of the vice grip to lock the arms in a clamped position about the workpiece. If the arms are too tight to close or are too loose, the adjustment bolt 26 may be screwed in or out to change the position of the arms in the clamped position. The operator can try again then to close the handles and lock the arms in the clamped position. A drill with a stepped drill bit is then inserted through the hole 14 in the pocket hole drill guide. The drill is turned on to drill the pocket hole. The drill is removed after the hole has been drilled. The lever 24 on the clamp can be pressed to release the grip from the clamped position so that the drill guide can be removed from the workpiece.

Figure 4:
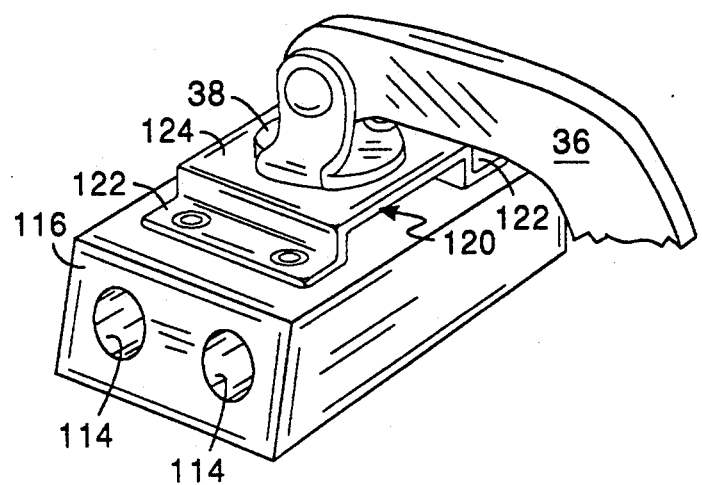
FIG. 4 is a partial view of an alternate embodiment of the clamping drill guide of FIG. 1.

An alternate embodiment of the invention uses a different arrangement for the drill guide on the second arm 36 as shown in FIG. 4. Here, the pocket hole drill guide includes two holes 114 for drilling a pocket hole side by side. The two holes 114 are parallel to one another and both extend from the end face 116 to a bottom side face of the metal block. In the alternate embodiment instead of the U-shaped bracket, a plate 120 is screwed onto a top side face above the two holes. The plate has two end portions 122 that are flush against the top face. These two end portions 122 are screwed into the metal block. A middle portion 124 of the plate is raised above the face of the metal block to form a platform. A rivet attaches the raised platform of the plate to the flat face of the yoke. Thus the hand-held clamping drill guide of the present invention may be provided with a two holed pocket hole drill guide for drilling adjacent pocket holes on a workpiece.

Of course, it should be understood that the various changes and modifications to the preferred embodiments described above will be apparent to those skilled in the art. For example, the clamp face 30 could be fixedly attached to the arm instead of using the pivotal attachment of the preferred embodiment. This and other changes can be made without departing from the spirit and scope of the invention and without diminishing its attendant advantages. It is therefore intended that such changes and modifications be covered by the following claims.

I claim:

1. A combination hand-held clamp and pocket hole drill guide comprising:
   a pocket hole drill guide;
   a pair of attached lockable clamp handles;
   first and second opposed solid C-shaped arms, each having one end connected to said clamp handles and a second end, the second ends of said first and second arms being movable between an open position and a clamped position by said clamp handles;
   a clamp face pivotally attached to the second end of said first C-shaped arm; and
   a yoke having a flat face coupled to said pocket hole drill guide and a pair of legs depending from said yoke, the pair of legs being arranged with the second end of said second solid C-shaped arm therebetween and further comprising a pin inserted through said pair of legs and the second end of said second solid C-shaped arm to allow said pocket hole drill guide to pivot about said pin into or out from between the second ends of said first and second opposed solid C-shaped arms.

2. The combination clamp and drill guide of claim 1 further comprising a pivot pin mounted through the flat face of said yoke and attached to said pocket hole drill guide so as to permit said pocket hole drill guide to rotate adjacent the flat face of said yoke about said pivot pin.

3. The combination clamp and drill guide of claim 1 further comprising a plate with two ends screwed onto said pocket hole drill guide and a raised platform between the two ends, the raised platform being connected to the flat face of said yoke.

4. The combination clamp and drill guide of claim 3 further comprising a pivot pin mounted through the flat face of said yoke and through the raised platform so as to permit said pocket hole drill guide to rotate on the flat face of said yoke about said pivot pin.

5. The combination clamp and drill guide of claim 1 wherein said pocket hole drill guide includes two parallel holes for guiding drill bits.

6. A hand-held clamping drill guide comprising:
   a metal block having at least one hole therein extending from an end face to a side face;
   first and second opposed C-shaped arms, each having a first end and a second end, said first and second opposed C-shaped arms defining a first plane in which both said first and second opposed C-shaped arms lie;
   a pair of handles pivotally attached to the first ends of said first and second arms and adapted to be operated by the hand of an operator, said handles being movable between an open position and a clamped position in which the second ends of said arms are prevented from being pulled apart;
   a lever connected to one of said handles for releasing said handles from the clamped position;
   a clamp face mounted to the second end of said first C-shaped arm, wherein a work space is defined between a second and third plane, each of said second and third planes being parallel to each other and perpendicular to the first plane, said second plane touching upon the second end of said first C-shaped arm and said third plane touching upon the second of said second C-shaped arm; and
   a rotatable attachment connecting said metal block to the second end of said second C-shaped arm so as to permit an operator to clamp a workpiece in the workspace between said metal block and said clamp face so that a pocket hole can be drilled in the workpiece by guiding a drill through the hole in said metal block and wherein said rotatable attachment permits said metal block to be rotated about the second end of said second C-shaped arm removing said metal block from between the second and third planes.

7. The clamping drill guide of claim 6 wherein said rotatable attachment includes a yoke having a flat face and a pair of legs depending therefrom, the pair of legs being arranged with the second end of said second C-shaped arm therebetween and further including a pin inserted through said pair of legs and the second end of said second C-shaped arm to provide an axis about which the metal block can rotate.

8. The clamping drill guide of claim 7 further comprising a pivot pin mounted through the flat face of said yoke and attached to said metal block so as to provide a second axis about which said metal block can rotate.

9. The clamping drill guide of claim 6 further comprising a plate with two ends screwed onto said metal block and said plate further including a raised platform between the two ends.

10. The clamping drill guide of claim 9 further comprising a pivot pin mounted through the flat face of said yoke and through the raised platform so that said metal block can rotate about said pivot pin.

11. The clamping drill guide of claim 6 wherein the at least one hole in said metal block includes two parallel holes for guiding drill bits.

12. The clamping drill guide of claim 6 further comprising a pivotable attachment between said clamp face and the second end of said first C-shaped arm.

* * * * *